Nov. 8, 1932.  A. A. E. PENNEFATHER  1,886,726
SLEEVE LOCK SLING HOOK
Filed March 15, 1932
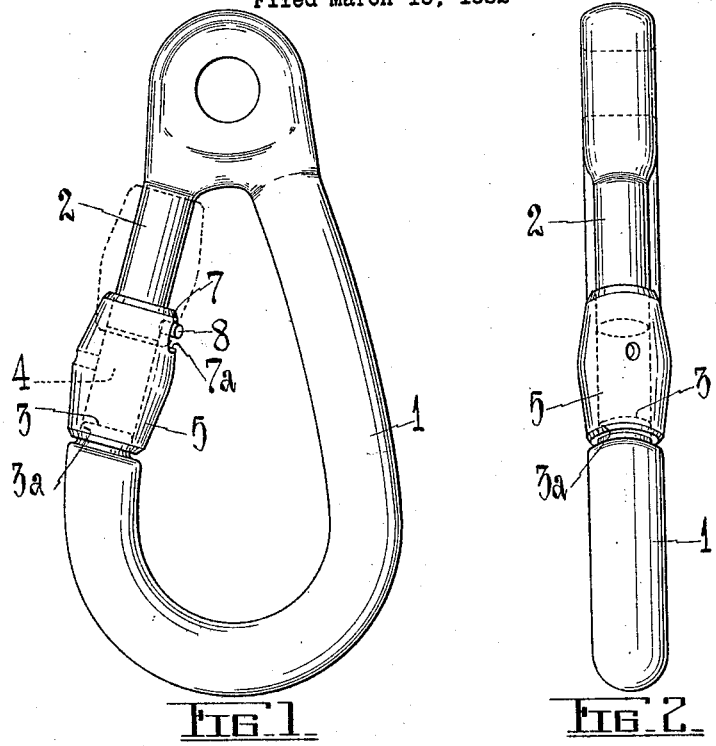
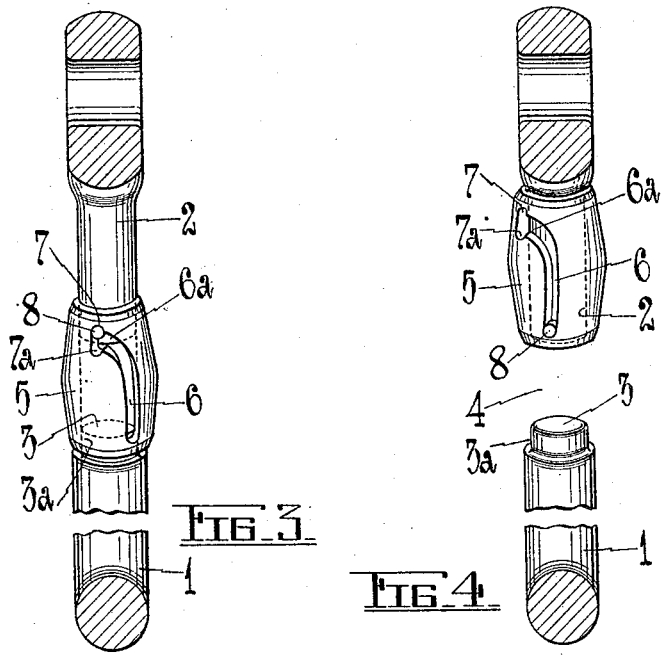
A. A. E. Pennefather
INVENTOR
Marks & Clerk
ATT'YS.

Patented Nov. 8, 1932

1,886,726

UNITED STATES PATENT OFFICE

ALFRED ARMSTRONG EDWARD PENNEFATHER, OF TIMARU, NEW ZEALAND

SLEEVE LOCK SLING HOOK

Application filed March 15, 1932, Serial No. 599,015, and in New Zealand March 27, 1931.

This invention relates to hooks of the kind used in conjunction with hoisting apparatus, for lifting and lowering articles or objects, or bundles thereof, out of or into ships' holds, or wherever loads require to be hoisted or lowered.

The object of the invention is to provide an improved form of hook, having incorporated therein a simple safety device comprising a minimum number of parts and which avoids the use of pivot pins, springs and catches, said safety device being capable of adjustment to close the hook opening, and confine a sling or the like therein and also of being adjusted to permit said sling or the like to be removed from the hook, while the safety device becomes locked in its closed position under gravity.

According to the invention, the improved hook is fitted with a sleeve slidable on a member of the hook extending over the point thereof, said sleeve containing a slot which passes upon a pin on said member and is disposed and formed to permit the sleeve to also pass upon the hook point and become locked in a position which closes the opening in the hook.

In the accompanying drawing in conjunction with which the invention will be more particularly described, Fig. 1 is a side elevation and Fig. 2 an edge elevation of a hook fitted with a safety device according to the invention, while Figs. 3 and 4 are sectional elevations of the hook, showing the safety device in its closed and open positions, respectively.

The hook 1 is formed with a member 2 which extends from the top of the hook to over the point 3 thereof, an opening 4 being left between said member 2 and said point 3 to enable a sling or the like to be passed into the hook or to be removed therefrom as required.

A sleeve 5 slidable and turnable on the member 2, contains a slot 6 which is passed upon a pin 8 on said member 2, the slot 6 being made long enough to permit the sleeve 5 to be raised far enough on the member 2, so as not to interfere with or obstruct the opening 4, and also so that said sleeve 5 can descend far enough to enable its lower end to pass upon the hook point 3 which is reduced as at 3a to take said sleeve, and so close the opening 4.

In order to enable the sleeve 5 to be locked in the closed position, the upper portion 6a of the slot 6 is made to curve to one side, and has opening therefrom an upper locking recess 7.

The curvature of the sides of the slot 6 is such that if the sleeve 5 be released, when in the open position illustrated in Fig. 4, it will descend by gravity and the curved portion 6a of the slot will pass upon the pin 8 and impart turning movement to the sleeve 5, whereby the sleeve will finally come to rest upon the reduced portion 3a of the point 3 and with the upper locking recess 7 engaged on the pin 8.

In this last described position the sleeve 5 closes the opening 4 and is locked or held against accidental disengagement and confines in the hook 1 a rope or the like previously passed thereinto, a lower locking recess 7a also open to the portion 6a of the slot 6 being also provided to receive the pin 8 and prevent the sleeve 5 from turning or working to the open position, should the hook be inverted.

To open the hook, the sleeve 5 is given slight upward movement simultaneously with a turning movement, to bring the main part of the slot 6 immediately below the pin 8, following which said sleeve can be raised to the full extent to clear the opening 4.

Upon being released, the sleeve 5 drops from the position illustrated in Fig. 4 to the position shown in Fig. 3.

The sleeve 5 is placed on the member 2 following the bending of the latter from over the point 3, and after said sleeve has been placed on the member 2, the latter is returned to the position shown.

What I do claim and desire to obtain by Letters Patent of the United States of America is:—

1. A hook of the class described including a rigid member opposed to the bill of the hook and spaced therefrom, a pin on the member, a sleeve slidably and rotatably mounted on the member and having a slot therein slidably receiving the pin, said sleeve having upper and lower recesses communicating with the upper end of the slot, the upper recess being engageable with the pin when said hook is in normal position and the lower recess when the hook is inverted, as and for the purpose set forth.

2. A hook as described in claim 1 wherein the slot extends longitudinally of the sleeve, and has an upper curved portion communicating with the upper and lower recesses.

In testimony whereof he has affixed his signature.

ALFRED ARMSTRONG EDWARD PENNEFATHER.